March 21, 1961 E. J. CHRISTIANO 2,976,469
MOTOR CONTROL CIRCUIT
Filed Dec. 14, 1959
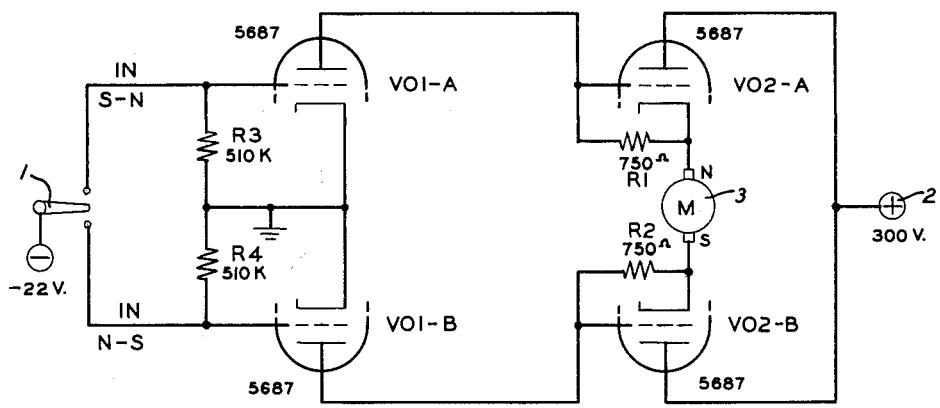
INVENTOR
EDWARD J. CHRISTIANO
BY W.J. Shanley Jr.
ATTORNEY

United States Patent Office 2,976,469
Patented Mar. 21, 1961

2,976,469
MOTOR CONTROL CIRCUIT

Edward J. Christiano, Rochester, N.Y., assignor to General Dynamics Corporation, Rochester, N.Y., a corporation of Delaware Filed Dec. 14, 1959, Ser. No. 859,390

5 Claims. (Cl. 318—293)

This invention relates to motor control circuits and particularly to electron tube circuits for controlling the current supply to a direct current reversible motor sometimes referred to as a servo motor.

The object of the invention is to provide a switching means in the form of a network of electron tubes responsive to potential changes in which the anode currents for clockwise and for counterclockwise rotation are alternatively provided by two tubes and in which such drive currents supplied by the plates of such tubes are completely used for such drive purposes. This is accomplished by providing another pair of tubes, one of which will be completely disabled by such drive current and the other of which will be transformed into the equivalent of a diode to completely pass said drive current, the said functions being interchanged when current in the reverse direction is to be passed.

The device of the present invention consists of a pair of congruent circuits including in each part thereof a pair of triodes, one functioning as a drive and the other functioning as a switching means. When, by input circuit control, the drive tube is completely cut off, its corresponding triode is converted to a completely conducting diode in one of said congruent circuits and the drive tube is rendered conducting and its corresponding triode is completely cut off in the other of said congruent circuits.

Defined in other words, the device of the present invention consists of a circuit for switching a source of current through a servo motor comprising a pair of dual triodes, all four sections of which are involved in a circuit operation, a first section being driven to conduction, a second section being completely cut off, and, under control of these two sections, a third section acting as a completely cut off triode and a fourth section acting as a completely conducting diode, the first dual triodes being controlled by potential changes on the grids thereof and the second of said dual triodes connecting the source of current connected in parallel to the anodes thereof to a circuit for a current flow through a servo motor in series with the cathodes thereof.

Of the tubes employed in this circuit, by way of example, one is known as a medium $\mu$ dual triode miniature and it acts in this circuit as a triode clamp. Letting S to N and N to S designate the direction of current flow in the motor to produce clockwise or counterclockwise rotation, then it may be said that both plates of the dual triode are connected to the source of current in such a manner that when one half has its grid clamped to its cathode and thus becomes essentially a diode, the resulting current flow through this diode and the motor produces a voltage drop at the grid of the other half which provides a bias to completely cut off such tube. Hence the plate current of the drive tube is completely used in the motor circuit.

A feature of the invention is the use of a dual triode electron tube in a circuit network whereby the grid of one of said triodes when clamped to the cathode thereof controls the application of a negative potential to the grid of the other of said triodes, thus rendering the first of said triodes fully conductive as a diode and completely cutting off the other of said diodes. Since the functions of these triodes may be interchanged, the said dual triode constitutes a simple reversing switch for controlling the direction of current flow through a circuit connected in between the cathodes of the two triodes.

Other features will appear hereinafter.

The drawings consist of a single figure in the form of a schematic circuit diagram.

In this showing a switch 1 having a normal and two operated positions represents a means to activate the circuit to cause the motor to operate in either one or the other direction, here designated S—N and N—S. If the switch 1 is moved to its lower position into connection with the input conductor N—S, the lower half VO1–B of the drive tube will have its grid driven to such a negative value (here shown as −22 volts) that the tube will be completely cut off and hence the lower half of the clamping tube VO2–B will have its grid clamped to its cathode, since the plate of tube VO1–B will be completely isolated. Consequently, tube VO2–B becomes essentially a diode and thus supplies a firm connection between the S terminal of the motor and the positive source of current (300 volts).

The grid of tube VO1–A will remain at ground level and this tube will then conduct so that current will flow from ground, through tube VO1–A, the bias resistor R–1, the N terminal of the motor, the motor 3, the S terminal thereof, the virtual diode VO2–B to the 300 volt source of current 2. The voltage drop developed across the bias resistor R–1 will set the grid of tube VO2–A to such a negative value that this tube will be completely cut off and the plate thereof will be completely isolated from the motor drive circuit.

It is believed that it will be readily apparent, without further description, that a similar but completely opposite circuit operation resulting in the operation of the motor in a S—N direction will take place if the switch 1 is moved to its upper contact.

What is claimed is:

1. An electronic circuit network for driving a permanent field direct current motor from a source of positive current in either of two directions through the application of a negative potential to either of two corresponding input terminals, consisting of a symmetrically connected pair of driving electron tubes and a symmetrically connected pair of clamping tubes, switching means for alternatively applying a negative potential to the grid of either one of said driving tubes of a value to completely cut off the said tube and to leave the other of said driving tubes in conduction, the plate of each of said driving tubes being connected to the grid of a corresponding clamping tube, a bias resistor connected between the grid and the cathode of each said clamping tube, the plates of said clamping tubes being connected to said source of positive current and the cathodes thereof being connected to said motor, whereby the isolation of the plate of a said driving tube acts to clamp the grid of its said corresponding clamping tube to the cathode thereof to convert said clamping tube to a diode to freely conduct current through said motor to said source of positive current and whereby the said current flowing through the said bias resistor of the other one of said clamping tubes provides a comparatively negative potential to the grid thereof of a value sufficient to completely cut off said other one of said clamping tubes.

2. An electronic circuit network for driving a servo motor from a source of positive current, consisting of a dual triode electron driving tube and a dual triode electron clamping tube, grid circuits for said driving tubes normally connected to ground, control means consisting of means to apply a negative potential alternatively to either of said driving tube grids to completely cut off one of said triodes, the plates of said dual triodes being connected to the grids of said dual triode clamping tubes and each through a biasing resistor to the cathodes thereof whereby the driving of one of said driving triodes to cut off acts to clamp the said grid and cathode of its associated clamping triode, and a servo motor connected between the cathodes of said clamping tubes, the plates of said clamping tubes being connected to said source of positive current.

3. An electronic circuit network for driving a servo motor in either one or the other direction from a source of direct current, consisting of a first dual triode means controlled to effectively establish a direct current path through a first half of said dual triode means and to disable a path through the second half of said dual triode means and alternatively controlled to produce a like but opposite result in said dual triode means, a second dual triode means controlled by said first dual triode means to convert the two halves of said second dual triode means into a completely cut off triode and a complete conducting diode and alternatively into an equal and opposite configuration responsive to the said equal and opposite control of said first dual triode means, a direct current motor connected to the cathodes of said second dual triodes means and a source of direct current connected to the anodes of said second dual triode means.

4. An electronic circuit network including a pair of congruent circuits each including a triode, means for controlling said network to render one of said triodes conductive and the other of said triodes completely cut off, a second pair of congruent circuits each including a triode, said first congruent circuits controlling said triodes of said second pair of congruent circuits to render one of said triodes a completely cut off triode and the other one thereof a completely conducting diode, a load circuit connected between the cathodes and a source of current connected to the anodes of said triodes of said second pair of congruent circuits.

5. A switching circuit including a source of direct current, a load circuit differently responsive to the direction in which said direct current source is connected thereto, a pair of input circuits responsive to potential variation, a pair of dual triodes included circuitwise between said input circuits and said source of direct current and including said load circuit, all four sections of said dual triodes being involved in a given circuit operation responsive to the application of a negative potential to one of said input circuits including a first section driven to conduction, a second section completely cut off and under control of these two said sections, a third section acting as a completely cut off triode and a fourth section acting as a completely conducting diode, the second of said dual triodes including said third and fourth sections having said source of current connected in parallel to the anodes thereof and having the cathodes thereof acting as connections for said load circuit.

No references cited.